United States Patent Office 3,788,806
Patented Jan. 29, 1974

3,788,806
MIXTURES OF 1 - AMINOANTHRAQUINONE-3,4-(N)-BENZACRIDONE DYESTUFFS AND PROCESS FOR DYEING POLYESTER FIBERS THEREWITH
Christian Heid and Ernst Heinrich, Frankfurt am Main-Fechenheim, Germany, assignors to Cassella Farbwerke Mainkur Aktiengesellschaft, Frankfurt am Main-Fechenheim, Germany
No Drawing. Continuation-in-part of abandoned application Ser. No. 234,989, Mar. 15, 1972. This application May 4, 1973, Ser. No. 357,220
Claims priority, application Germany, Apr. 1, 1971, P 21 15 917.1
Int. Cl. D06p 3/52; C09b 5/36
U.S. Cl. 8—25                                    6 Claims

ABSTRACT OF THE DISCLOSURE

Composition containing at least two dyestuffs of the formula

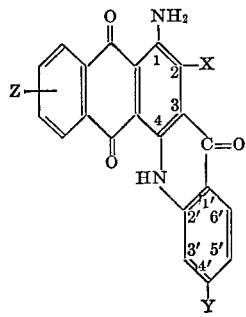

wherein X and Z are hydrogen or halogen and Y is hydrogen, halogen or trifluoromethyl, each dyestuff of said composition being present in an amount of at least 5% by weight, based on the weight of the total dyestuffs present.

---

This application is a continuation-in-part of application Ser. No. 234,989 filed Mar. 15, 1972 now abandoned.

The present invention relates to a dye composition containing at least two dyestuffs of the 1-aminoanthraquinone-3,4-(N)-benzacridone series of the formula

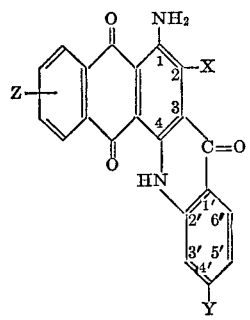

wherein X and Z are hydrogen or halogen and Y is hydrogen, halogen or trifluoromethyl. The preferred halogen substituents include chlorine and bromine.

Moreover, the present invention relates to a process for dyeing polyester materials in accordance with the high temperature process wherein the aforesaid composition is employed as the dye.

The dyestuffs embraced by Formula I are known. Some of them have been used as vat dyes. When employed as disperse dyes for dyeing polyester fibers according to the high-temperature process, it is found that they have a poor affinity for the fibers and are only suitable for the preparation of pale dyeings.

Unexpectedly, it has been found that a composition containing at least two dyestuffs of Formula I has markedly improved tinctorial properties for synthetic fibers and yields, when dyed on polyester material according to the high-temperature process, distinctly deeper dyeings than the individual components alone. In other words, the composition containing at least two of the aforesaid dyestuffs demonstrates a synergistic effect.

The dyestuff composition of the present invention may consist of a mixture of two or more dyestuffs of Formula I and may contain further substances such as dispersants. Typical dispersants include lignin sulfonates, naphthalene sulfonic acid/formaldehyde condensation products and condensation products on the basis of p-cresol/formaldehyde resin and 2,6-naphthol sulfonic acid.

Preferably, compositions of the present invention contain the dyestuffs in finely dispersed form which is achieved by grinding the dyestuffs with a suitable dispersant.

As noted above, the dye composition of the present invention should contain at least 5% by weight of each dyestuff of Formula I included therein, based on the total dyestuff weight. Preferably, each dyestuff is present in an amount of at least 25% by weight.

The following example is for the purpose of illustrating the present invention. The temperatures are in degrees centigrade and the parts are parts by weight.

EXAMPLE

A mixture consisting of 2.25 parts 1-aminoanthraquinone-3,4-(N)-benzacridone and 0.75 part 1-amino-4'-chloro-anthraquinone-3,4-(N)-benzacridone in a finely dispersed form is stirred into 2000 parts of water. The reaction mixture is adjusted with acetic acid to a pH of 5–6 and admixed with 4 parts ammonium sulfate and 2 parts of a commercial dispersant based on a naphthalene sulfonic acid/formaldehyde condensation product. 100 parts of a polyester fabric of polyethylene glycolterephthalate are introduced into the dye bath thus obtained and dyeing is carried out for 1½ hours at 130°. After subsequent rinsing, reductive after-treatment with an alkaline sodium dithionite solution of 0.2% during 15 minutes at 60–70°, rinsing and drying, one obtains a turquoise dyeing having very good fastness properties, in particular an excellent fastness to light and to dry-heat setting.

The dyeing thus obtained is about 50% deeper than a dyeing obtained with 3 parts of each component of the above mixture. If a dyestuff composition consisting of 2.4 parts 1 - amino - anthraquinone-3,4-(N)-benzacridone and 0.6 part 1-amino-4'-chloro-anthraquinone-3,4-(N)-benzacridone is employed one obtains a dyeing having the same coloring power as obtained by the use of the dyestuff composition of the preceding paragraph.

Typical dyestuffs of Formula I which may be employed in the compositions of the present invention include:

1-amino-4'-trifluoromethyl-anthraquinone-3,4-(N)-benzacridone,
1-amino-4'-bromo-anthraquinone-3,4-(N)-benzacridone,
1-amino-2-chloro-anthraquinone-3,4-(N)-benzacridone,
1-amino-2-bromo-anthraquinone-3,4-(N)-benzacridone,
1-amino-2-chloro-4'-chloro-anthraquinone-3,4-(N)-benzacridone,
1-amino-2-bromo-4'-trifluoromethyl-anthraquinone-3,4-(N)-benzacridone, and
1-amino-6/7-chloro-anthraquinone-3,4-(N)-benzacridone.

We claim:
1. A dye composition comprising at least two dyestuffs of the formula

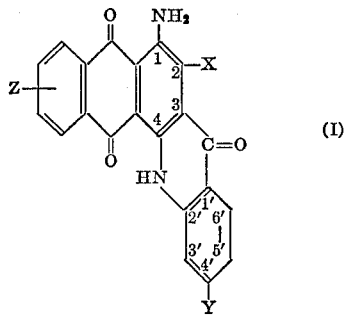

wherein X and Z are hydrogen, bromo or chloro and Y is hydrogen, bromo, chloro or trifluoromethyl, each of the dyestuffs of said composition being present in an amount of at least 5% by weight, based on the total dyestuff weight present in the composition.

2. The dyestuff composition of claim 1 wherein each dyestuff is present in an amount of at least 25% by weight, based on the total dyestuff weight present in the composition.

3. The dye composition of claim 1 wherein X, Y and Z of one of said dyestuffs of said composition are each hydrogen.

4. The dye composition of claim 1 wherein one of said dyestuffs is 1-amino-anthraquinone-3,4-(N)-benzacridone.

5. The dye composition of claim 1 including a dispersant selected from the group consisting of lignin sulfonates, naphthalene-sulfonic acid/formaldehyde condensation products and condensation products on the basis of p-cresol/formaldehyde resin and 2,6-naphthol sulfonic acid.

6. In the process of dyeing polyester fibers by the high-temperature process, the improvement which comprises employing the dye composition of claim 1.

References Cited
UNITED STATES PATENTS
3,084,015    4/1963    Grossman _____ 8—25

LEON D. ROSDOL, Primary Examiner

B. H. HESS, Assistant Examiner

U.S. Cl. X.R.
8—39; 260—277